US008966454B1

(12) United States Patent
Michelsen et al.

(10) Patent No.: US 8,966,454 B1
(45) Date of Patent: Feb. 24, 2015

(54) MODELING AND TESTING OF INTERACTIONS BETWEEN COMPONENTS OF A SOFTWARE SYSTEM

(75) Inventors: John J. Michelsen, Irving, TX (US); Jean-David Dahan, Austin, TX (US)

(73) Assignee: Interactive TKO, Inc., Plano, TX (US)

( * ) Notice: Subject to any disclaimer, the term of this patent is extended or adjusted under 35 U.S.C. 154(b) by 415 days.

(21) Appl. No.: 13/155,363

(22) Filed: Jun. 7, 2011

Related U.S. Application Data

(60) Provisional application No. 61/407,008, filed on Oct. 26, 2010.

(51) Int. Cl.
G06F 9/44 (2006.01)
G06F 15/173 (2006.01)

(52) U.S. Cl.
USPC ........... 717/133; 717/125; 717/127; 717/132; 709/223; 709/224

(58) Field of Classification Search
USPC .......... 709/224; 717/104, 124, 155, 171, 120, 717/127, 128, 131
See application file for complete search history.

(56) References Cited

U.S. PATENT DOCUMENTS

| | | | |
|---|---|---|---|
| 5,450,586 A | 9/1995 | Kuzara et al. | |
| 5,581,696 A | 12/1996 | Kolawa et al. | |
| 6,002,871 A | 12/1999 | Duggan et al. | |
| 6,249,882 B1 | 6/2001 | Testardi | |
| 6,381,628 B1 * | 4/2002 | Hunt | 709/201 |
| 6,473,707 B1 | 10/2002 | Grey | |
| 6,513,155 B1 | 1/2003 | Alexander, III et al. | |
| 6,587,969 B1 | 7/2003 | Weinberg et al. | |
| 6,601,020 B1 | 7/2003 | Myers | |
| 6,668,371 B2 | 12/2003 | Hamilton et al. | |
| 7,310,777 B2 * | 12/2007 | Cirne | 715/763 |
| 7,343,587 B2 | 3/2008 | Moulden, Jr. et al. | |
| 7,362,709 B1 * | 4/2008 | Hui et al. | 370/237 |
| 7,382,371 B1 * | 6/2008 | Ciabarra | 345/440 |
| 7,392,507 B2 | 6/2008 | Kolawa et al. | |
| 7,529,242 B1 * | 5/2009 | Lyle | 370/392 |
| 7,721,265 B1 | 5/2010 | Xu et al. | |
| 8,015,279 B2 * | 9/2011 | Christodoulou et al. | 709/224 |

(Continued)

OTHER PUBLICATIONS

J. Case, et. al., A Simple Network Management Protocol (SNMP), May 1990, IETF, RFC 1157, 1-36.*

(Continued)

*Primary Examiner* — Lewis A Bullock, Jr.
*Assistant Examiner* — Mark Gooray
(74) *Attorney, Agent, or Firm* — Patent Capital Group

(57) ABSTRACT

A first set of information is identified, collected by a first agent during monitoring of a first software component. A second set of information is identified, that was collected by a second agent during monitoring of a second software component. It can be determined that the first and second sets of information each include characteristics of a particular transaction involving the first and second software components. A model is generated of the particular transaction based at least in part on the first and second sets of information. The model includes a representation of the involvement of the first and second software components within the particular transaction. In some aspects, characteristics included in the first and second set of information can include timing information for use, for example, in generating a model representing ordering of software components' involvement in one or more transactions.

23 Claims, 7 Drawing Sheets

(56) References Cited

U.S. PATENT DOCUMENTS

| | | | |
|---|---|---|---|
| 2002/0026535 A1* | 2/2002 | Srinivasan | 709/320 |
| 2003/0088663 A1 | 5/2003 | Battat et al. | |
| 2004/0025083 A1 | 2/2004 | Nanja et al. | |
| 2004/0068560 A1 | 4/2004 | Oulu et al. | |
| 2004/0123272 A1 | 6/2004 | Bailey et al. | |
| 2004/0225919 A1 | 11/2004 | Reissman et al. | |
| 2005/0097515 A1 | 5/2005 | Ribling | |
| 2005/0102423 A1 | 5/2005 | Pelavin et al. | |
| 2005/0204201 A1* | 9/2005 | Meenakshisundaram et al. | 714/38 |
| 2006/0037000 A1* | 2/2006 | Speeter et al. | 717/120 |
| 2006/0048100 A1 | 3/2006 | Levy et al. | |
| 2006/0059169 A1 | 3/2006 | Armishev | |
| 2006/0129992 A1 | 6/2006 | Oberholtzer et al. | |
| 2006/0206870 A1 | 9/2006 | Moulden, Jr. et al. | |
| 2006/0225030 A1* | 10/2006 | Deffler | 717/104 |
| 2007/0258387 A1* | 11/2007 | Patel et al. | 370/254 |
| 2008/0090549 A1* | 4/2008 | Vialen et al. | 455/405 |
| 2008/0262797 A1* | 10/2008 | Carusi et al. | 702/186 |
| 2009/0049429 A1 | 2/2009 | Greifeneder et al. | |
| 2009/0199274 A1* | 8/2009 | Frazier et al. | 726/4 |
| 2011/0302235 A1 | 12/2011 | Monk et al. | |

OTHER PUBLICATIONS

J. Moy, OSPF Version 2, Apr. 1998, IETF, RFC 2328, 1-244.*

Suhayya Abu-Hakima, et. al., A Common Multi-Agent Testbed for Diverse Seamless Personal Information Networking Applications, Jul. 1998, IEEE, IEEE Communications Magazine, pp. 68-74.*

Xipeng Xiao, et.al., Reducing routing table computation cost in OSPF, 1999, IEEE, ,119-124.*

Andrew S. Tanenbaum, Structured Computer Organization, 1984, Prentice-Hall, Inc., 2nd edition, ISBN: 0138544891, 10-12.*

Andrews et al., "Tool Support for Randomized Unit Testing", Jul. 2006, pp. 36-45, available online at <http://delivery.acm.org/1 0.1145/1150000/1145741 /p36-andrews.pdf>.

Saff et al., "Automatic Test Factoring for Java", Nov. 2005, pp. 114-123, available online at <http://delivery.acm.org/1 0.1145/111 0000/11 01927/p114-saff.pdf>.

Chang Liu, "Platform-Independent and Tool-Neutral Test Descriptions for Automated Software Testing", Jun. 2000, available online at <http://delivery.acm.org/1 0.1145/340000/337598/p713-liu.pdf>.

U.S. Appl. No. 13/244,029, filed Sep. 23, 2011.

U.S. Appl. No. 13/244,076, filed Sep. 23, 2011.

LISA, 2.0 User's Guide, Interactive TKO, Feb. 27, 2003, pp. 1-130.

LISA, 2.0 Developer's Guide, Interactive TKO, Mar. 13, 2003, pp. 1-23.

OASIS, "ebXML Test Framework Draft Document—Version 0.91", Dec. 2002, The Organization for the Advancement of Structured Information Standards, 92 pages.

Non-Final Office Action in U.S. Appl. No. 13/244,029 mailed on Apr. 12, 2013.

Response to Non-Final Office Action dated Apr. 12, 2013 in U.S. Appl. No. 13/244,029, filed Jul. 12, 2013.

Non-Final Office Action in U.S. Appl. No. 13/244,076 mailed on May 16, 2013.

Notice of Allowance in U.S. Appl. No. 13/244,029 mailed on Nov. 6, 2014.

Final Office Action in U.S. Appl. No. 13/244,027 mailed on Jan. 16, 2014.

Request for Continued Examination and Amendment in U.S. Appl. No. 13/244,027, filed Apr. 16, 2014.

Response to Non-Final Office Action dated May 16, 2013 in U.S. Appl. No. 13/244,076, filed Aug. 16, 2013.

Final Office Action in U.S. Appl. No. 13/244,076 mailed on Jan. 17, 2014.

Request for Continued Examination and Amendment in U.S. Appl. No. 13/244,076, filed Apr. 16, 2014.

* cited by examiner

MODELING AND TESTING OF INTERACTIONS BETWEEN COMPONENTS OF A SOFTWARE SYSTEM

This patent application claims the benefit of priority under 35 U.S.C. §120 of U.S. Provisional Patent Application Ser. No. 61/407,008, filed Oct. 26, 2010, entitled "MODELING AND TESTING OF INTERACTIONS BETWEEN COMPONENTS OF A SOFTWARE SYSTEM", which is expressly incorporated herein by reference in its entirety.

TECHNICAL FIELD

This invention relates to software testing and, more particularly, to testing service oriented architectures and similar systems that include multiple independent components.

BACKGROUND

In many testing scenarios, it is difficult to determine how each of several different components of a software system is affecting performance. For example, a software developer may be unable to determine whether a new application is responding too slowly due to performance problems within the application itself, network congestion affecting the application's interactions with a web server from which the application obtains data, or a sluggish database that the web server interacts with. Since each of these components may be implemented independently, it is difficult to be able to test all of the components in a manner that captures the interactions between the components. Furthermore, since some of the components may not allow modification of their code for testing purposes, this difficulty may be exacerbated.

SUMMARY

In general, one aspect of the subject matter described in this specification can be embodied in methods that include the actions of identifying, using at least one processing device, a first set of information collected by a first agent during monitoring of a first software component. A second set of information can be identified, that was collected by a second agent during monitoring of a second software component. It can be determined that the first and second sets of information each identify characteristics of a particular transaction involving the first and second software components. A model can be generated of the particular transaction based at least in part on the first and second sets of information. The model can include a representation of the involvement of the first and second software components within the particular transaction.

In another general aspect of the subject matter described in this specification, a system can include a memory element storing data, a processor operable to execute instructions associated with the stored data, an instrumentation broker, and a model generator. The instrumentation broker can be configured to identify a first set of information collected by a first agent during monitoring of a first software component, identify a second set of information collected by a second agent during monitoring of a second software component, and determine that the first and second sets of information each identify characteristics of a particular transaction involving the first and second software components. The model generator can be configured to generate a model of the particular transaction based at least in part on the first and second sets of information. The generated model can include a representation of the involvement of the first and second software components within the particular transaction.

In still another general aspect, subject matter described in this specification can be embodied in methods that include the actions of monitoring a first software component, using an agent interfacing with the first software components, the first software component included within a particular software system including a plurality of software components. A first set of information can be captured using the agent, the first set of information identifying characteristics of involvement of the first software component in a particular transaction involving at least one other second software component. The agent can send the first set of information to a broker for use by the broker in generating a model of the particular transaction based at least in part on the first set of information. The model can include a representation of the involvement of the first and second software components within the particular transaction.

These and other embodiments can each optionally include one or more of the following features. The first and second sets of information can identify characteristics including timing information of the particular transaction. The first set of information can include first timing information identifying timing of the involvement of the first software component in the particular transaction and the second set of information can include second timing information identifying timing of the involvement of the second software component in the particular transaction. Determining that the first and second sets of information each identify characteristics of the particular transaction can include identifying a correlation between timing information included in the first set of information and timing information included in the second set of information. The first and second sets of information can identify characteristics including amounts of data involved in the particular transaction, and determining that the first and second sets of information each identify characteristics of the particular transaction can include identifying a correlation between an amount of data identified in the first set of information and an amount of data identified in the second set of information. The model can include a representation of timing of the particular transaction. Generating such a model can include determining that involvement of the first software component precedes, in time, involvement of the second software component within the particular transaction.

Further embodiments can each optionally include one or more of the following features. A third software component can be identified that is involved in a second transaction including the first software component. It can be identified that the third software component does not have an active, corresponding agent. A synthetic third set of information can be generated for the third software component modeling characteristics of involvement of the third software component in the second transaction. An ordering of the respective involvement of the first and third software components within the second transaction can be determined based at least in part on the third set of information. An ordering of the second transaction relative to the particular transaction can be determined based at least in part on the first, second, and third sets of information. Indeed, in some aspects, the generated mode can include representations of a plurality of transactions including the particular transaction based on a plurality of sets of information, including the first and second sets of information and at least one other set of information. The plurality of sets of information can be sorted into respective transactions in the plurality of transactions. Generating the model can include determining ordering of the plurality of transactions. The first and second sets of information can be collected, using the first and second agents respectively, during execution of a test of a software system including the first and second software components. The first and second sets of information can identify characteristics including amounts of data involved in the particular transaction, and determining that the first and second sets of information each identify characteristics of the particular transaction can include identifying a correlation between an amount of data identified in the first set of information and an amount of data identified in the second set of information. The first and second software components can be sub-components of a common software component and generating the model can include generating a representation of the common software component based at least in part on the first and second sets of information.

Further embodiments can each optionally include one or more of the following features. The model can be a graphical model graphically representing each of the first and second software components and involvement of the first and second software components within the particular transaction. The model can represent an aspect of a test and is adapted to respond to user interactions with the graphical model, wherein a user interaction communicating a modification of the model modifies the test. The model can further graphically represent a plurality of transactions involving at least the first and second software components. One or more agents in a plurality of agents can be configured to automatically disable upon detecting a period wherein the software component monitored by the agent is not involved in a particular test. The first set of information can be captured by an agent, at least in part, based on data sent between the first and second software components during the particular transaction. The data sent between the first and second software components can be received by the first software component from the second software component, where the first set of information includes an identification of the second software component as a parent of the first software component within the particular transaction. The first set of captured information can include timing information and the model can include a representation of the ordering of the respective involvement of the first and second software components in the particular transaction. It can be determined whether activity of the first software component is related to a particular test, and information can be captured for inclusion in the first set of information based at least in part on whether the information relates to activity of the software component within the particular test. Activity of the first software component can be ignored when not related to the particular test.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

BRIEF DESCRIPTION OF THE DRAWINGS

A more complete understanding of the present invention may be acquired by referring to the following description and the accompanying drawings, in which like reference numbers indicate like features.

Figure 1:
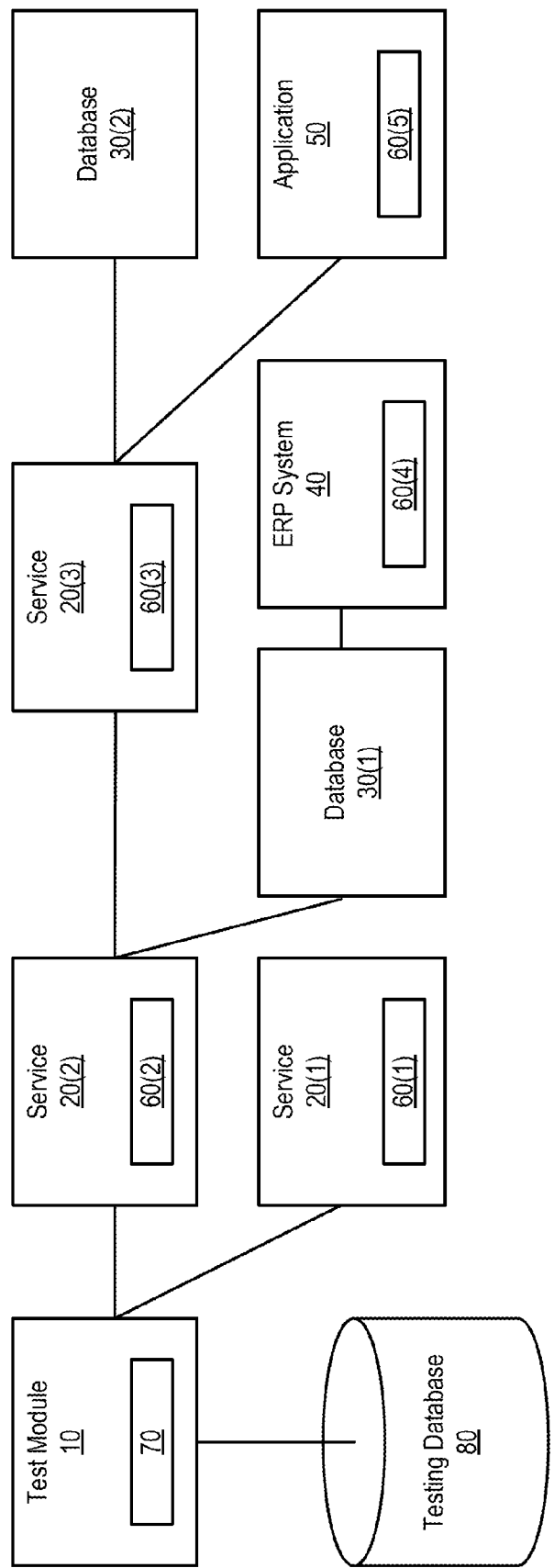
FIG. 1 is a block diagram of a test system in which a software architecture that includes multiple independent software components is being tested, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of an example test system in which a software architecture that includes multiple independent software components is being tested. As shown, the software architecture includes a test module 10, a plurality of services 20(1), 20(2), and 20(3), databases 30(1) and 30(2), an enterprise resource planning (ERP) system 40, and one or more applications 50. All or some of these components can be implemented in software that is executing on a computing device (e.g., a personal computer, server, personal digital assistant, telephone, tablet computer, smartphone, or the like).

The components shown in FIG. 1 can all be implemented on the same computing device. However, in many embodiments, at least some of these components (or portions thereof) can be implemented on different computing devices, all or some of which can be coupled via one or more networks (e.g., a local area network, storage area network, and/or wide area network such as the Internet).

At least some of the components being tested by the test system may not yet be in production (i.e., these components are still in a development and/or testing phase), while other components may already be in production (e.g., these components have already been tested and released and are now being used in a production environment). The components that are still in development and/or undergoing testing are referred to as being pre-production components.

Each service 20(1)-20(3) can provide any of a variety of different services and can be implemented as any one or more of a variety of software components. For example, each service 20 can be a web service (e.g., having an interface defined by a web service definition language (WSDL) file), a web site (e.g., as implemented by one or more web pages provided by a web server), enterprise service, or the like. Services 20(1)-

20(3) can each be implemented as an object or other component (e.g., an enterprise service bus (ESB) construct, an Enterprise JavaBean (EJB), a web component such as a JavaServer Pages (JSP) page or Java servlet component, other standalone Java component, or Java applet), as an application that includes any of the previously-mentioned components, or the like.

Databases 30(1) and 30(2) can each include a database server, database management system, and other utilities configured to assist in responding to requests to access information stored in a database. Application 50 can be any of a variety of different applications and can include any one or more of a variety of different software components. Other components that can be included in a testing system such as the one shown in FIG. 1 include a legacy application operating on a mainframe, a data service, an order manager, a transactional data store, an enterprise application integration (EAI) system, or the like.

Test module 10 is configured to execute a test case by sending requests to and receiving responses and other data from one or more of the components of the system under test. In this example, the test module executes a test case that calls services 20(1) and 20(2). In response to being called, each service should return a response to test module 10. Test module 10 can then verify that the response received from each service was the expected response. Service 20(1) generates its response independently, without needing to call any other service or component. In contrast, service 20(2)'s response is dependent upon database 30(1), which in turn can be dependent upon ERP system 40, and service 20(3), which in turn can depend on other databases (e.g., 30(2)), applications (e.g., 50) and the like.

To aid in monitoring the performance of the different components in the system under test, one or more of the components can include an instrumentation agent. In particular, service 20(1) includes instrumentation agent 60(1), service 20(2) includes instrumentation agent 60(2), service 20(3) includes instrumentation agent 60(3), ERP system 40 includes instrumentation agent 60(4), and application 50 includes instrumentation agent 60(5).

Instrumentation agents 60(1)-60(5) (collectively referred to herein as instrumentation agents 60) can be software-implemented agents that are configured to provide visibility into the operations of each instrumented component to test module 10. Each instrumentation agent 60 is configured to detect requests and responses being sent to and from the component in which that instrumentation agent is embedded. Each instrumentation agent 60 is configured to generate information about the detected requests and/or responses and to report that information to an instrumentation broker 70 within, coupled to, or otherwise associated with test module 10. Additionally, each instrumentation agent 60 can be configured to detect and report on activity that occurs internally to the component in which the instrumentation agent is embedded.

While the example of FIG. 1 illustrates a system in which there is one instrumentation agent per component, other embodiments may be implemented differently. For example, in some systems, there is a one-to-one correspondence between the number of instrumentation agents within a component and the number of processes (or other subcomponents) to be monitored within that component. In such embodiments, each instrumentation agent monitors and reports on its corresponding sub-component.

In response to detecting a request, response, and/or other activity to be monitored, each instrumentation agent 60 is configured to detect one or more characteristics associated with that activity and/or the monitoring of that activity by the instrumentation agent. The characteristics can include a frame identifier, which identifies a message, with respect to the instrumentation agent, sent by the instrumentation agent to the instrumentation broker to report the characteristics; a parent identifier, which identifies the requester that generated the request sent to the component or sub-component monitored by the instrumentation agent; a transaction identifier, identifying the transaction, with respect to the component or sub-component being monitored; and an agent identifier that identifies the instrumentation agent, with respect to the other instrumentation agents in the testing system, that is generating the characteristics, Such characteristics can include other information such as a system clock value, current processor and/or memory usage, contents of the request, contents of the response to the request, identity of the requester that generated the request, identity of the responder generating the response to the request, Java virtual machine (JVM) statistics, standard query language (SQL) queries (SQLs), number of database rows returned in a response, logging information (e.g., messages logged in response to a request and/or response), error messages, simple object access protocol (SOAP) requests, values generated by the component that includes the instrumentation agent but that are not returned in the response to the request, web service invocations, EJB method invocations, EJB entity lifecycle events, heap sizing, and the like. Characteristics can also include the thread name of a thread processing the request to generate the response, the class name of the class of an object invoked to process the request to generate the response, a Web Service signature used to contain the request and/or response, arguments provided as part of the request and/or response, a session identifier, an ordinal (e.g., relating to an order within a transaction), the duration of time spent processing the request and/or generating the response, state information, a local Internet Protocol (IP) address, a local port, a remote IP address, a remote port, and the like.

As the above examples indicate, characteristic information can include information generated by the instrumentation agent itself and information generated and/or processed by the component or sub-component monitored by the instrumentation agent. The instrumentation agent then causes information identifying those characteristics to be provided to an instrumentation broker 70 within (as shown) or coupled to test module 10. In some embodiments, each instrumentation agent collects information to form a message, also referred to herein as a frame, which describes characteristics associated with both a detected request and a detected response corresponding to that request. In such embodiments, the instrumentation agent can wait for the response corresponding to the request to be generated and sent before sending the frame to the instrumentation broker.

Instrumentation agents 60 can monitor and report characteristics independently for each transaction in which the component (e.g., services 20, ERP system 40, application 50, etc.) being monitored participates. In addition to monitoring the performance of a single component and aggregating information about that component over a multitude of transactions (such that information about the performance of individual transactions can, for example, averaged, based upon the observed performance of the component over the course of performing the multitude of transactions), instrumentation agents 60 can additionally provide characteristics that are specific to and correlated with a specific transaction. More particularly, these characteristics that are monitored and reported by instrumentation agents 60 can be specific to and correlated with a particular request and/or response generated as part of a transaction.

Instrumentation agents 60 can monitor activity (e.g., such as receipt of a request from test module 10 and any responses or related activity generated in response to such a request) initiated by test module 10, as well as activity generated in response to requests received from other components beside test module 10. Thus, instrumentation agents 60 can provide information about individual transactions that are not necessarily part of a test case.

In some embodiments, the instrumentation agents 60 communicate with instrumentation broker 70 via a messaging system such as Java™ Message Service (JMS). For example, instrumentation broker 70 can create a messaging system topic for each transaction (referred to herein as a transaction frame (TF) topic) and subscribe to that TF topic. The instrumentation agents 60, upon startup, broadcast their existence to each other and/or to instrumentation broker 70. The instrumentation agents 60 can then get the TF topic from instrument broker 70 and begin publishing messages onto a message bus on that TF topic. Instrumentation broker 70 can monitor the published messages and determine whether those messages relate to the current TF topic. As needed, instrumentation broker 70 creates new TF topics for new transactions.

Instrumentation agents 60 can alternatively communicate with instrumentation broker 70 using techniques other than those involving messaging systems. For example, instrumentation agents 60 can write information to testing database 80 using database commands, and instrumentation broker 70 can monitor those database commands to detect new information.

Some instrumentation agents 60 can be implemented by inserting a few lines of code into the software component (or the application server associated with that software component) being instrumented. Such code can be inserted into a servlet filter, SOAP filter, a web service handler, an EJB3 method call, a call to a Java Database Connectivity (JDBC) handler, and the like. For example, an instrumentation agent configured to monitor an EJB can be configured as an EJB3 entity listener (e.g., to monitor entity beans) or interceptor (e.g., to monitor session beans). For example, in some implementations, instrumentation agents 60 can include functionality similar to functionality described, for instance, in U.S. patent application Ser. No. 11/328,510, titled "Instrumentation System and Method for Testing Software," filed Jan. 9, 2006, and listing John J. Michelsen as an inventor, which is hereby incorporated by reference in its entirety as if completely and fully set forth herein.

Some components (or their corresponding application servers) may not provide users with the ability to modify their code, and thus some instrumentation agents can be implemented externally to the component being monitored in a manner that can cause all requests and responses being sent to and/or from that component to be handled by the instrumentation agents. For example, for an existing database, an instrumentation agent can be implemented as a driver. Calling components can be configured (e.g., by manipulating a driver manager) to call the instrumentation driver instead of the database's driver. The instrumentation driver can in turn call the database's driver and cause the database's driver to return responses to the instrumentation driver. For example, in one embodiment, the identity of the 'real' driver for the database can be embedded in the uniform resource locator (URL) that is passed to the instrumentation driver. In this way, the instrumentation driver can intercept all calls to the database, detect characteristics of those calls, pass the calls to the appropriate database, detect characteristics of the corresponding responses, and then return the characteristics of those calls and responses to instrumentation broker 70.

In some embodiments, all or some of instrumentation agents 60 are configured to perform interception and/or inspection (e.g., using the Java™ Virtual Machine Tool Interface, or JVM TI). Such an instrumentation agent can register with the appropriate application programming agent (API) associated with the component or process being monitored in order to be notified when entry and/or exit points occur. This allows the instrumentation agent to detect requests and responses, as well as the characteristics of those responses. In particular, this functionality can allow an instrumentation agent to detect when a component begins reading and/or writing from and/or to a socket, to track how much data is accessed (e.g., read or written), obtain a copy of the data so read or written, and generate timing information (as well as information describing any other desired characteristics) describing the time at which the data was read or written.

Some instrumentation agents 60 are configured to monitor individual threads by monitoring the storage used by each thread (i.e., the thread local storage for that thread). Such instrumentation agents 60 can detect when the monitored thread begins reading or writing to a thread local variable in the thread local storage. In response to detecting this access to the thread local variable, the instrumentation agent tracks the amount (e.g., in bytes, as tracked by incrementing a counter) of data that has been accessed, as well as the starting offset within the thread local storage to which the access takes place. In response to detecting that the thread's access to the thread local variable has ended, the instrumentation agent can use the information about the access to identify characteristics such as the time of the access, the variable being accessed, the value being accessed, and the like.

As noted above, one of the characteristics that can be collected by instrumentation agents 60 is timing information, such as a timestamp, that indicates when a particular request was received or when a particular response was generated. As described in more detail below, such timing information can be used by instrumentation broker 70 to identify that frames received from different instrumentation agents 60 are related to the same transaction. In order to enable instrumentation broker 70 to rely on such information, the instrumentation agents 60 can be configured to synchronize the timers used by those agents to generate the timing information with similar times used by other instrumentation agents in the same system. In some instances, any one of a variety of conventional clock synchronization techniques can be used.

As requests and responses progress through the test system, additional characteristic information is captured and sent to the instrumentation broker 70 by the instrumentation agents 60. For example, when test module 10 sends a request to service 20(2), instrumentation agent 60(2) can capture characteristic information associated with that request (e.g., the time at which the request was received, the sender of that request, the time at which corresponding requests were sent to database 30(1) and/or service 20(3), and the like) and the corresponding response, and then send that characteristic information to instrumentation broker 70. Instrumentation agents 60 can send information to instrumentation broker 70 independently of each other, as well as independently of the progress of the test case.

The information returned to instrumentation broker 70 by instrumentation agents 60 is temporarily stored (e.g., in a log in testing database 80). Instrumentation broker 70 then organizes this information for more permanent storage in testing database 80. As organized by instrumentation broker 70, the information can be processed, manipulated, and displayed to users by test module 10, as described in more detail below.

Instrumentation broker 70 organizes the information so that information that describes characteristics of a portion of a particular transaction is grouped with other information describing the same transaction. Thus, instrumentation broker 70 groups individual frames, each of which can be received from a different instrumentation agent 60, into groups of frames that describe a complete transaction.

In some embodiments, in order to group frames, instrumentation broker 70 first sorts the frames based upon timing information associated with and/or included within those frames. After being sorted, the frames can be arranged in ascending or descending order, with respect to the timing information. For example, the frames can be sorted according to a timestamp indicating when each frame was generated, when one or more requests identified in each frame were generated or received, and/or when one or more responses identified in each frame were generated or received. In some embodiments, the frames can be sorted based upon multiple pieces of timing information.

After sorting the frames, instrumentation broker 70 then groups the frames into transactions. In one embodiment, this act can involve looking at information indicating the amount of data that was received and/or generated, as detected by the instrumentation agent, as well as information identifying the components or sub-components involved in communicating with each other to cause the monitored activity. For example, such identity information can include information identifying the network ports (e.g., of the requester and responder) used to communicate a request and corresponding response between a requester and responder. This information can correlate two different frames that have similar timing information and data amounts. For instance, in one example, instrumentation agent 60(2) can send a frame to instrumentation broker 70 indicating that, among other things, service 20(2) sent a request that was approximately 2K bytes in size to service 20(3) at 09:42:01. Instrumentation agent 60(3) can send a frame to instrumentation broker 70 indicating that, among other things, service 20(3) received a request that was approximately 2K in size from service 20(2) at 9:42:55. Based upon this information, instrumentation broker 70 can determine that the two frames describe different portions of the same transaction. It is noted that the amount of data identified in each frame is likely to not be identical, but may likely be similar. Similarly, the timing information may not be identical, but can likely be appropriately similar or conform to a particular threshold of acceptability, given the communication delays between the requester and responder. The timing and data amounts may be organized in respective columns within a database.

Instrumentation broker 70 can group frames into the same transaction by adding a transaction identifier to (or modifying an already-present transaction identifier within) the characteristic information included in each frame. In particular, each frame identified as corresponding to the same transaction is associated with the same transaction identifier. In one embodiment, the transaction identifier used for all of the frames associated with the same transaction is the transaction identifier associated with the first (i.e., earliest) frame associated with that transaction. Generally, transaction identifiers are generated in such a manner that the each transaction identifier will be unique throughout time with respect to a given testing system. The transaction identifiers can be organized into a transaction column within a database and can, in at least some embodiments, be used as a primary key.

Within a group of frames associated with the same transaction, instrumentation broker 70 can order the frames, such that the flow of the transaction can be followed from the start of the transaction to the end of the transaction. Each frame can include a field that identifies that frame (e.g., a frame ID), as well as a field that identifies a parent frame (e.g., a parent frame ID). The value of each frame's parent frame ID can equal another frame's frame ID. These frame identifiers can be generated by the instrumentation agents. In one embodiment, the frame identifiers can be generated from information identifying the IP address (or other addressing information) and port number used by the monitored component or sub-component, the amount of data sent or received by the monitored component during the monitored activity, and/or the instrumentation agent itself. The parent and frame identifiers can be organized into respective columns within a database.

As shown in FIG. 1, some components tested by the testing system do not include instrumentation agents. Accordingly, some of the activity that occurs within a transaction may not be fully identified in any of the frames received from the instrumentation agents. Instrumentation broker 70 is configured to detect these situations and to generate appropriate frames corresponding to the uninstrumented components. These frames are referred to herein as synthetic frames. Synthetic frames may not contain as much information as is included in frames generated by instrumentation agents.

To detect situations in which a synthetic frame is needed, instrumentation broker 70 keeps track of all of the instrumentation agents included in the testing system, as well as the components or sub-components monitored by those instrumentation agents. Instrumentation broker 70 processes all of the frames in the same transaction. For instance, if a particular frame indicates that a request was received from a component that is not being monitored by an instrumentation agent, instrumentation broker 70 can create a synthetic frame for that requester. This synthetic frame's frame identifier can then be set as the value of the parent identifier in the non-synthetic frame that identified the request received from the unmonitored component. Similarly, if a particular frame indicates that a request was sent to a component that is not being monitored by an instrumentation agent, instrumentation broker 70 can create a synthetic frame for the responder to which the request was sent. The parent identifier of the synthetic frame can be set to indicate the frame that identified the request. The synthetic frames can have the same transaction identifier as the frames that triggered creation of the synthetic frame.

Instrumentation broker 70 can include information such as a frame identifier, transaction identifier, IP address, port, data included in a request and/or response, and timing information in a synthetic frame. This information can be generated by instrumentation broker 70 from information in other non-synthetic frames or even copied from other non-synthetic frames. For example, the timing information can be calculated based upon a time at which the component represented by the synthetic frame was sent a request by a requester and the time at which the requester received a response back from the component. The IP address and port can be copied from a parent or child frame (a frame is a child frame of a parent frame if that frame identifies the parent frame in its parent frame identifier field).

In some situations, a synthetic frame can be created in response to processing one non-synthetic frame, and then subsequently linked to another non-synthetic frame through the use of a parent identifier. For example, in the example of FIG. 1, instrumentation broker 70 can receive non-synthetic frames from instrumentation agent 60(2), which monitors service 20(2), and instrumentation agent 60(4), which monitors ERP system 40. Database 30(1) is not instrumented, and thus no agent is available to generate frames corresponding to activity in database 30(1). Accordingly, in response to, for example, processing a first non-synthetic frame received from agent 60(4), instrumentation broker can create a synthetic parent frame for the first frame that corresponds to activity in database 30(1). Subsequently, when processing a second non-synthetic frame received from instrumentation agent 60(2), instrumentation broker 70 can detect that the second frame describes a request sent to database 30(1). Accordingly, instrumentation broker 70 can set the synthetic frame's parent frame identifier to indicate the second frame.

Once the information is organized and stored in testing database 80, test module 10 can extract that information, process the extracted information, display that information (or graphics or text representing that information) to a user, and/or allow a user to manipulate a test case based upon that information. For example, the test module can use the information in testing database 80 to identify which components were involved in the execution of the test case; in order to identify response times for certain system components, based upon the differences in request and response times; and the like, and to display that information to a user.

Figure 6:
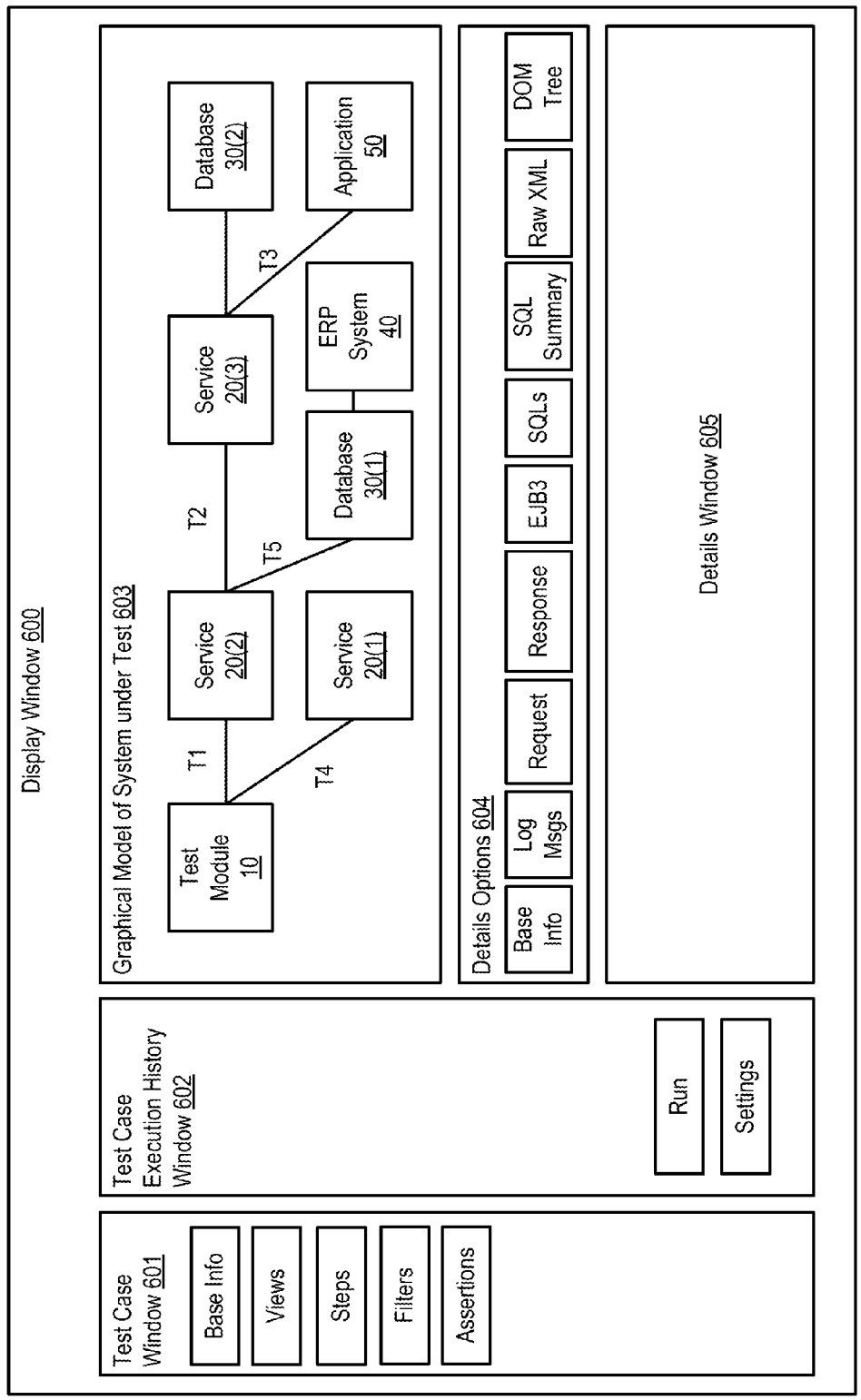
FIG. 6 is a block diagram of a display window that includes a model of a test system and allows a user to interact with the test system via the model, according to one embodiment

Test module 10 can display the processed information to a user in a display window such as that shown in FIG. 6. The displayed information can identify each component or sub-component that was involved in the test case (e.g., each of the components shown in FIG. 1). The user can then manipulate the displayed information in order to see details of the testing process and/or modify a test case.

As noted above, the characteristic information captured by the instrumentation agents 60 distributed throughout the system can describe individual requests and/or responses that test module 10 (and the services 20(1) and 20(2) being called by test module 10) would otherwise not have access to. Thus, the information displayed to the user can include information describing activity (e.g., each transaction can include a request and its corresponding response, as well as any requests and responses performed as different components were called in the process of generating the corresponding response) to which test module 10 was not a party. Accordingly, even though test module 10 does not directly communicate with certain components of the test system, test module 10 can nevertheless display information representing those components and characteristics of transactions in which those components participated. Thus, a user can now view information describing which and how components interact in response to a single test case executed by a single test module, without needing to create independent test cases and/or test modules for each component. Furthermore, this information can include information about components that are not themselves directly monitored by instrumentation agents 60 associated with the testing system, such as database 30(1) and database 30(2) of FIG. 1.

The information displayed by test module 10 can include information identifying the response times and response data generated by each component. This can allow a user to pinpoint errors or identify where performance bottlenecks are arising.

As an example of how such an instrumentation broker and one or more instrumentation agents can be used to provide visibility into a service oriented architecture (SOA), consider an example situation in which the test module is configured to execute a test case, which includes a web service call, every ten minutes. In this example, calling the web service can result in three EJBs being called, and one of those EJBs can in turn issue several SQL statements. If the service begins to fail, a user can view the information representing the characteristics of the most recent test case execution provided by the test module (which in turn received the information from instrumentation agents monitoring the EJBs). This information can indicate that one of the expected SQL statements is not being issued (e.g., one of the instrumentation agents can generate characteristics information identifying which SQL statements were issued, and this information fails to identify one of the expected SQL statements). Accordingly, the user can quickly identify why the web service is failing, without having to independently test each of the EJBs called by that web service.

In some embodiments, instrumentation agents 60 can be selectively enabled and disabled. For example, the instrumentation modules 60 can support an is Enabled( ) function will return true unless an administrator has explicitly disabled the instrumentation module (e.g., by setting a system property accessed by is Enabled( ) to a value indicating that testing is currently disabled).

Similarly, in some embodiments, each instrumentation agent 60 can be configured to determine whether a particular request and/or response is part of a test case being executed by test module 10 and selectively generate frames based upon whether a test case is currently being executed. For example, instrumentation modules can do this by searching requests and/or responses for special hypertext transfer protocol (HTTP) headers or SOAP headers. In some embodiments, instrumentation modules can perform this search using a hash table lookup. If the request and/or response is part of a test case, an instrumentation agent 60 can then capture characteristics associated with the request and/or response and cause information identifying those characteristics to be returned to instrumentation broker 70. Otherwise, such information may not be returned to instrumentation broker 70.

While instrumentation agents can be selectively enabled and/or configured to selectively capture information for test module 10 in some embodiments, other embodiments may not support one or both of these features. For example, some embodiments may support selectively enabling instrumentation agents but may not support selectively capturing and returning information (i.e., such systems may capture and return information for all requests and/or responses, whether or not those requests and/or responses are part of a test case, so long as the instrumentation agents are enabled). Similarly, some embodiments may support selective capture of information, but may not support selective enablement of instrumentation agents. Yet other embodiments may not support either feature.

Figure 2:
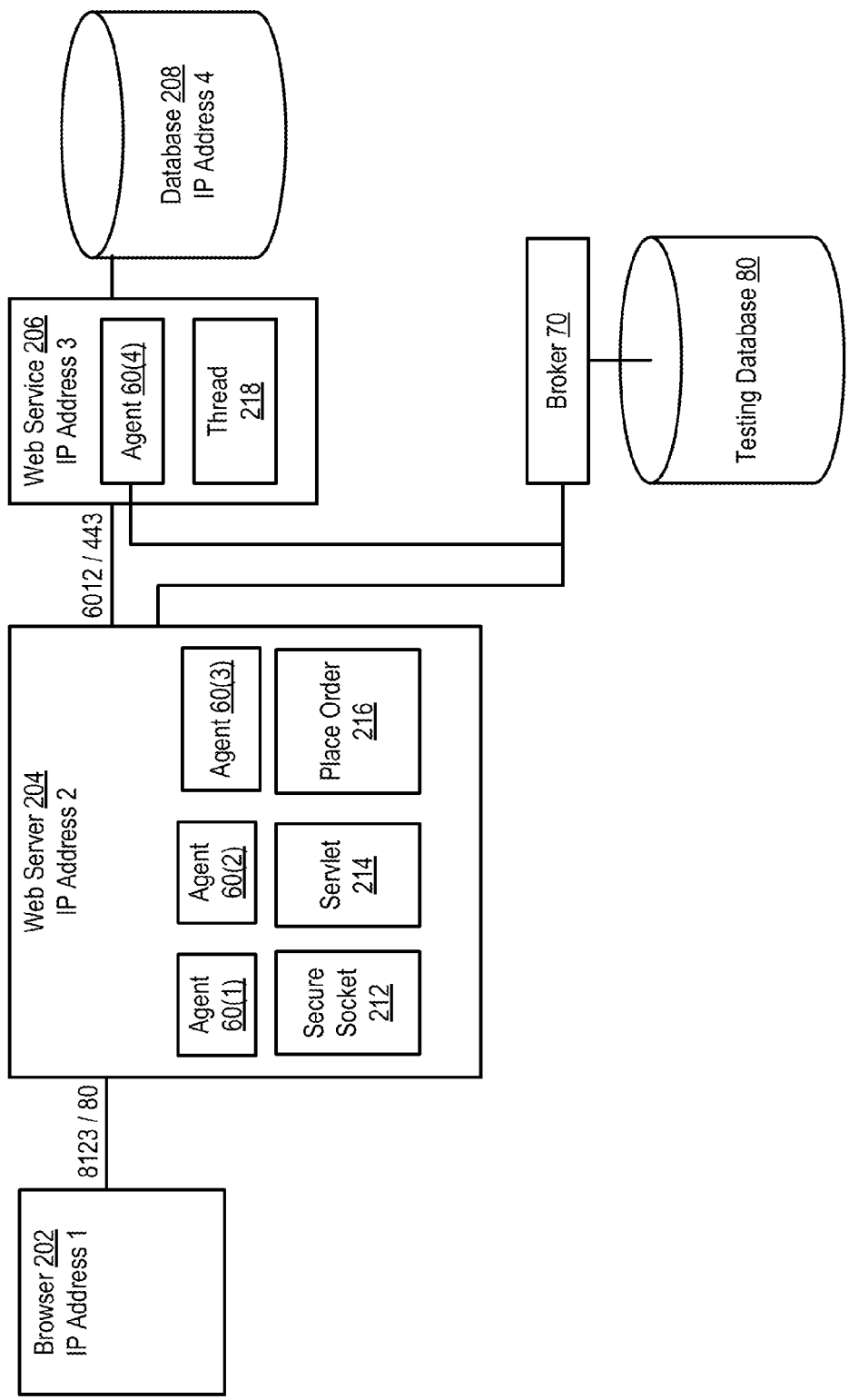
FIG. 2 is a block diagram of another system under test, according to one embodiment of the present invention.

FIG. 2 shows another example of a system under test that includes instrumentation agents 60 (which are similar to the similarly-numbered instrumentation agents of FIG. 1), which are configured to send frames to an instrumentation broker 70 that organizes the received frames for storage in testing database 80. In this example, the system under test includes a browser 202, a web server 204, a web service 206, and a database 208. Web server 204 includes several sub-components, including secure socket module 212, servlet 214, and place order module 216.

Each component is assigned an IP address. Browser 202 is assigned IP Address 1. Web server 204 is assigned IP Address 2. Web service 206 is assigned IP Address 3. Database 208 is assigned IP Address 4.

Some components are directly monitored by an instrumentation agent, including web service 206, which includes an instrumentation agent 60(4) monitoring a thread of execution 218, and web server 204, which includes a separate instrumentation agent for each sub-component. Instrumentation agent 60(1) monitors secure socket module 212, instrumentation agent 60(2) monitors servlet 214, and instrumentation agent 60(3) monitors place order module 216.

A transaction begins when browser 202 sends a request from port 8123 to port 80 of web server 204. No instrumentation agent monitors browser 202, and thus no frame corresponding to this activity in browser 202 can be sent to instrumentation broker 70.

Secure socket module 212 receives the request via port 80. This activity is detected by instrumentation agent 60(1), which begins temporarily storing information identifying the characteristics of the request, including the port and IP address from which the request was sent (port 8123 and IP Address 1), the port via which the request was received (port 80 and IP Address 2), the time at which the request was received, the data included in the request, the amount of data included in the request, and the like. In response to processing the request, secure socket module 212 can send a request to (e.g., by calling) servlet 214. Instrumentation agent 60(1) can detect and store the characteristics of this request as well, including information identifying the requester, secure socket module 212, and the responder, servlet 214.

Instrumentation agent 60(2) detects the request sent to servlet 214 and similarly begins temporarily storing characteristics associated with this request. Servlet 214 processes the request received from secure socket module 212 and sends a corresponding request to place order module 216. Instrumentation agent 60(2) can detect and store the characteristics of this request as well.

Instrumentation agent 60(3) detects the request sent to place order module 216 and begins storing information associated with this request. In order to get information in order to respond to the request, place order module 216 sends a request to web service 206 via port 6012. Instrumentation agent 60(3) can also store characteristics of this request, including the port and IP address from which the request was sent (port 6012 and IP Address 2) and the port and IP address to which the request was sent (port 445 and IP Address 4).

Similarly, instrumentation agent 60(4) detects the reception of the request by thread 218 of web service 206 and begins storing information corresponding to the request. Thread 218 sends a request to access database 208 in response to the request. Instrumentation agent 60(4) also stores information associated with this request, including the IP address (IP Address 3) from which the request was sent and the IP address (IP Address 4) to which the request was sent.

In response to the request from thread 218, database 208 performs the requested database access and sends a response to thread 218. Instrumentation agent 60(4) detects this response and stores information associated with the response, including the time at which it was received and appropriate IP address information. Thread 218 then generates a response to place order module 216. Instrumentation agent 60(4) detects this response and stores the associated characteristics. Instrumentation agent 60(4) then inserts all of the saved characteristic information into a frame and sends the frame to instrumentation broker 70.

Instrumentation agent 60(3) detects the response received by place order module 216 from web service 206 and saves information corresponding to that response. Place order module 216 processes the response and then generates a response to servlet 214. Instrumentation agent 60(3) detects and stores characteristics of this response, and then inserts all of the saved characteristics (including that associated with the request received from servlet 214, the response sent to servlet 214, the request sent to web service 206, and the response received from web service 206) into a frame. Instrumentation agent 60(3) then sends the frame to instrumentation broker 70.

Instrumentation agent 60(2) detects the response received by servlet 214 from place order module 216 and saves corresponding characteristic information. Servlet 214 processes the response received from place order module 216 in order to generate a response to secure socket module 212. Instrumentation agent 60(2) also save the characteristics of that response, and then sends a frame containing all of the saved information to instrumentation broker 70.

Instrumentation agent 60(1) detects the response sent from servlet 214 to secure socket module 212 and stores characteristics of that response. Secure socket module 212 processes the response to generate a response to browser 202. Instrumentation agent 60(1) also stores characteristics of this response. Instrumentation agent 60(1) then generates a frame containing all of the stored characteristics and sends the frame to instrumentation broker 70.

Instrumentation broker 70 orders the frames received from instrumentation agents 60(1)-60(4) according to timing information within the frames. Instrumentation broker 70 then uses component-identifying information such as IP addresses, ports and the like, as well as data sizes, to correlate requests and responses identified in different frames with each other. For example, the frame received from instrumentation agent 60(1) can identify the same request (the request sent by secure socket module 212) as the frame received from instrumentation agent 60(2). Based upon this, instrumentation broker 70 determines that the frame received from instrumentation agent 60(1) is the parent frame of the frame received from instrumentation agent 60(1).

Instrumentation broker 70 can also detect that several synthetic frames are needed. For example, the frame received from instrumentation agent 60(1) indicates that a request was received from browser 202. Instrumentation broker 70 can identify that browser 202 is not instrumented with an instrumentation agent. Accordingly, instrumentation broker 70 can create a synthetic frame that is the parent frame of the frame received from instrumentation agent 60(1) and that corresponds to the activity in browser 202 to send the initial request to web server 204 and receive the corresponding response from web server 204. Similarly, instrumentation broker 70 can create a synthetic frame to correspond to the activity in database 208.

Figure 3:
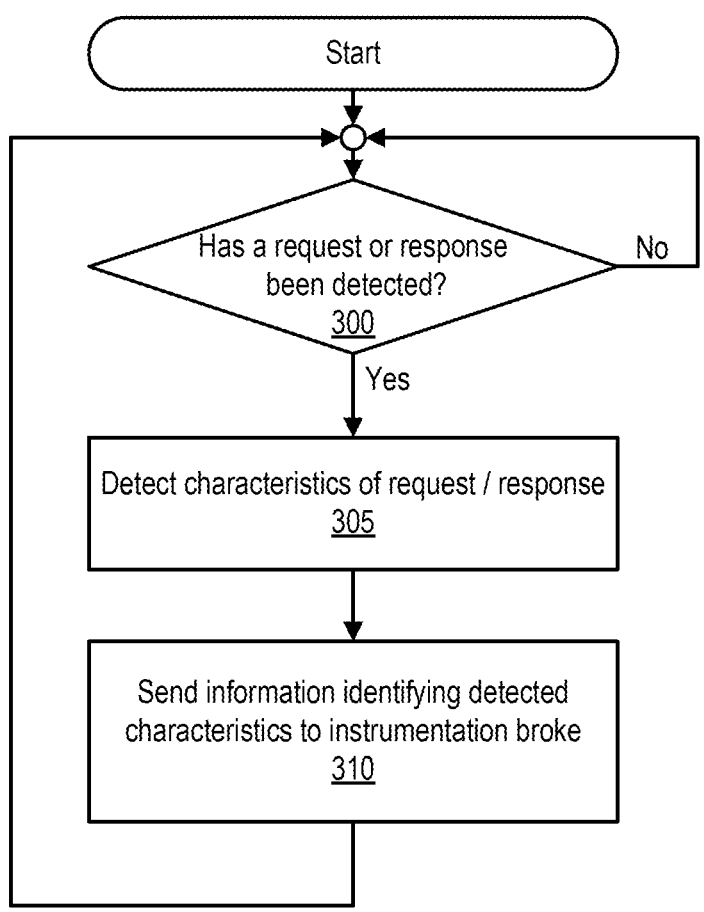
FIG. 3 is a flowchart of an example technique for generating information for use in modeling and testing that can be performed by an instrumentation agent, according to one embodiment of the present invention.

FIG. 3 is a flowchart of an example technique for generating information for use in modeling and testing that can be performed, for example, by an instrumentation agent (e.g., one of instrumentation agents 60 of FIG. 1 or 2). As shown, the technique can include detecting a request or response, as shown at 300, detecting characteristics of that request or response, as shown at 305, and then sending the characteristics of that request or response to an instrumentation broker, as shown at 310. The characteristic information can be encrypted, compressed, or otherwise manipulated before being sent to the instrumentation broker.

Detecting a request or response can involve observing Java beans, detecting calls to a driver associated with an application being called, detecting HTTP requests, detecting messages in a queue, and the like. Detecting a request or response (or information being sent or received as part of a response or request) can also involve monitoring a socket or thread local storage.

Detecting characteristics can involve detecting an identity (e.g., in terms of a network address or other identifying information included in a request or response) of the component sending a request or response, detecting a system clock value or other time at which a request or response is received or sent, detecting contents of the request and/or response, detecting log and/or error messages, detecting system resource usage, detecting values generated by the component generating the request and/or response that are not actually included in the request and/or response, and the like. Various types of characteristic information are described above. In some embodiments, the instrumentation agent can begin obtaining characteristic information in response to detecting receipt of a request, and can continue to obtain characteristic information to describe all activity in the monitored component until a response to the request is sent by the monitored component.

Figure 4:
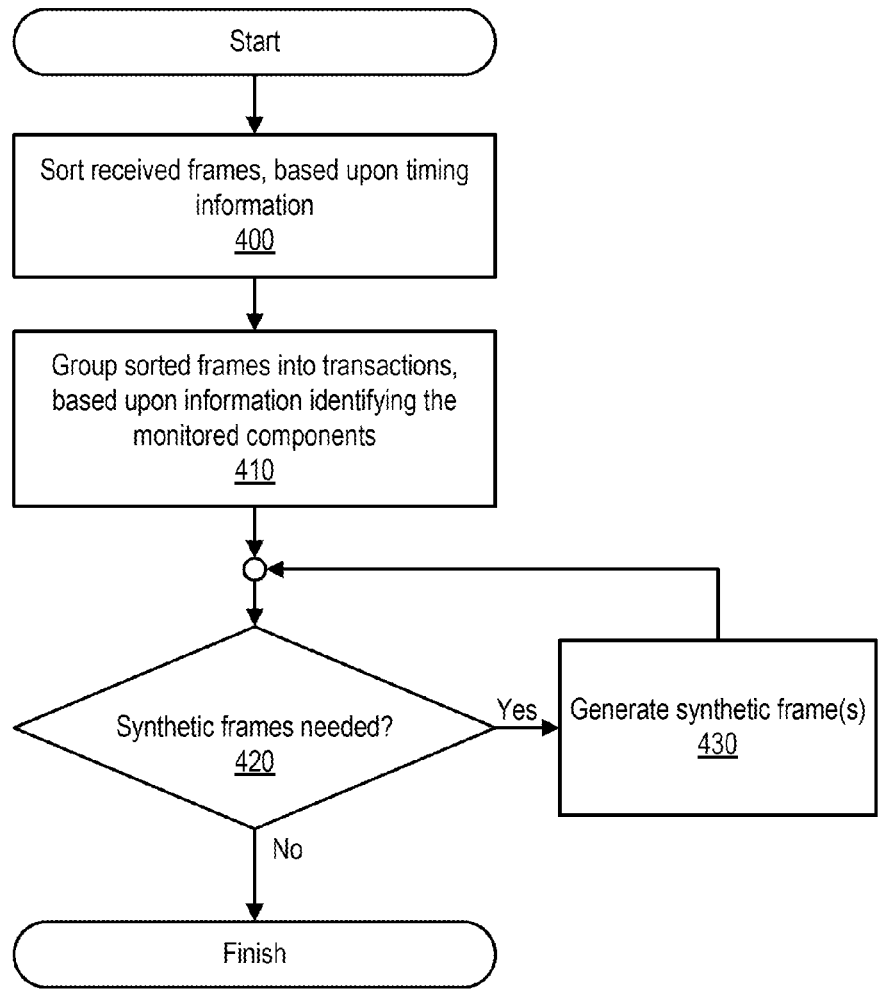
FIG. 4 is a flowchart of an example technique for organizing information that can be performed by an instrumentation broker, according to one embodiment of the present invention.

FIG. 4 is a flowchart of an example technique performed, for example, by an instrumentation broker (e.g., instrumentation broker 70 of FIG. 1 or 2). Information received from individual instrumentation agents can be organized, each of which may be monitoring a different component and/or executing in a different computing device, into information describing a complete transaction that involves multiple components.

At 400, the received frames can be sorted based upon one or more items of timing information (e.g., such as timestamps) included in each frame. For example, the frames can be sorted based upon a timestamp included within each frame that indicates when the instrumentation agent that generated the frame began generating the frame. The timing information used to sort the frames can include timing information associated with requests and/or responses.

The sorted frames can be grouped into transactions, as shown at 410, such that each transaction includes one or more frames. The frames can be grouped based upon their sorted (based upon operation 400) position, as well as upon information within the frames that is usable to identify components that generated requests and/or responses identified in the frames. For example, one frame can indicate that a first component, as identified by an IP address and/or port, sent a request of size X at time T1. Another frame can indicate that a second component received a request of size Y at time T2 from a component identified by the first component's IP address and/or port. If X and Y are approximately the same (e.g., within a user-specified margin) and if the difference between T2 and T1 corresponds to a communication delay between the first and second component, it can be determined that these two frames describe the same request and are part of the same transaction.

As noted above, grouping frames into transactions can involve assigning the same transaction identifier to all frames within the same transaction. Additionally, relationships between frames can be established through the use of parent frame identifiers, as described above. These parent frame identifiers can be generated, for example, by the instrumentation broker and/or by instrumentation agents.

At 420, it can be determined whether any synthetic frames are needed. Performing operation 430 can involve processing the frames included in a particular transaction to see if any frames identify requests and/or responses received from and/or sent to components that are not directly monitored by instrumentation agents. In response to detecting one or more such frames within a transaction, the instrumentation agent creates one or more synthetic frames, as shown at 430. Synthetic frames can be generated using techniques such as those described in more detail above.

Figure 5:
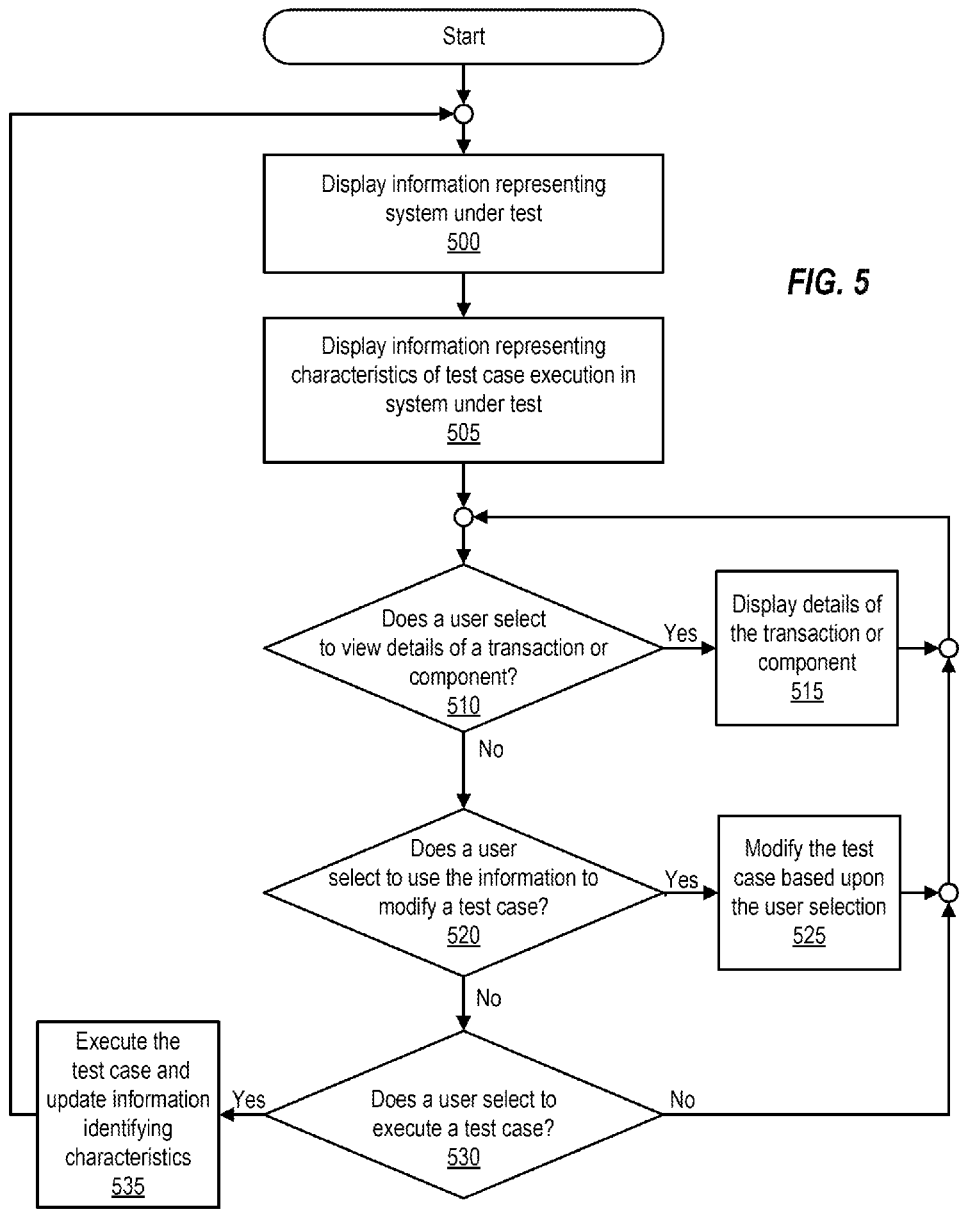
FIG. 5 is a flowchart of an example technique for generating a model of a system under test and allowing a user to interact with the system under test by interacting with the model, according to one embodiment of the present invention.

FIG. 5 is a flowchart of an example technique for generating a model of a system under test from a database organized, for instance, by an instrumentation broker using data provided, for instance, from a plurality of instrumentation agents. The generated model can be adapted to allow a user to interact with the system under test by interacting with the model. Such a technique can be performed, for example, by a test module such as the one illustrated in FIG. 1.

The example technique begins at 500, when information is displayed to a user representing the system under test. This information can identify the components within the system, including components that do not directly interact with the test module. The test module can identify these components based upon characteristic information identifying which components sent and/or received various requests and/or responses during the execution of a test case, such that only those components that participated in the test case are identified. The information identifying the participating components can be generated by instrumentation modules distributed throughout the system under test and embedded within responses returned to the test module, as described above.

Performing operation 500 can involve compressing information contained in several frames into a single representation. For example, a component may have several sub-components, and a transaction may include a separate frame corresponding to each of the sub-components. The test module can generate a single representation (e.g., display text, icon, or the like) for the component, and display that single representation along with information obtained from one or more of the frames associated with the sub-components. This type of compression can be performed on service boundaries in some embodiments. In other instances, the presented system representation can generate separate representations for one or more of the sub-components. Further, the test module can generate user friendly names, graphic icons, and/or other representations for components or other components.

Information can also be displayed representing characteristics of the execution of a test case in the system under test, as shown at 505. This information can include information generated by instrumentation agents and/or information obtained by processing information generated by instrumentation agents. For example, the test module can generate a response time by calculating the difference between the time at which one component sent a request to another component and the time at which the other component returned a response to the requester.

The information displayed at 505 can also include information describing resource usage at a particular component when a particular request was received and/or when a particular response was generated, information describing the contents of a request or response, information identifying values generated by the component in response to receiving a particular request or as part of the process of generating a particular response, and the like.

The information displayed at 500 can be textual or graphical, or a combination of textual and graphical information. For example, as shown in FIG. 6, the information can include a graphical model of the system under test as well as text labels identifying various characteristics of the system under test.

The user can then manipulate the displayed information in order to view more details, modify a test case, or execute a test case. For example, the user can select one of the components identified as being part of the system under test during a particular test case in order to view more details regarding that component and its participation in the execution of the test case. In some embodiments, the test module provides functionality to graphically represent and allow user manipulation of a test case. Indeed, in some implementations, a test module can include functionality similar to that described, for instance, in U.S. patent application Ser. No. 11/328,509, titled "Graphical Model for Test Case Viewing, Editing, and Reporting," filed Jan. 9, 2006 and listing John J. Michelsen as an inventor, which is hereby incorporated by reference in its entirety as if completely and fully set forth herein.

Thus, if a user selects to view details of a transaction or component (e.g., by clicking on or otherwise selecting a graphical or textual representation of that transaction or component from the information displayed by the test module), as detected at 510, the selected details can be displayed to the user, as indicated at 515. Selected details can include details identifying a transaction (e.g., by transaction identifier) or component (e.g., by name and/or network address), details of request(s) received by and/or response(s) generated by a component, details regarding the component's performance (e.g., in terms of response time), details relating the component's performance to the performance of other components (e.g., by displaying a chart or graph that indicates the percentage of the total test case execution time that was due to that component), and the like.

If the user selects to use the information to modify a test case, as detected at 520, the test case is modified based upon the user input, as shown at 525. For example, the characteristics displayed at 505 can each represent a test case property, and a user can select to add a filter or assertion to such a test case property. Filters can be used to modify certain properties. For example, a filter can be applied to a property in order to see how components that consume that property behave after that property is modified or to determine what happens if a particular property is forced to have a certain value. Assertions can be used to vary the flow of test case execution (e.g., by stopping execution of the test case) based upon a property (e.g., based upon whether the property has an expected value). Modifying a test case can involve editing an existing test case or creating a new test case.

As an example, a user can select a property representing a number of rows that were returned by a database in response to an SQL query and make an assertion based on the number of rows (e.g., to fail the test case if the number of rows is greater than a particular number). Similarly, the user can select a response time and make an assertion based upon that response time (e.g., to fail the test case if the response time exceeds 2 ms). Similarly, the user can select a particular component and make an assertion based upon whether that component is invoked during execution of the test case (e.g., to fail the test case if the component is not invoked).

If the user selects to execute a test case, as detected at 530, the test module executes the test case (this test case may have been modified at 525). Execution of a new test case can cause new characteristic information to be generated by the instrumentation agents within the system under test and that new characteristic information to be organized by an instrumentation broker. Accordingly, in response to executing a test case, the test module can update its display by reperforming one or both of operations 500 and 505 with the new information provided by the instrumentation modules during execution of the test case.

While FIG. 5 shows certain operations being performed serially, it is noted that such operations can alternatively be performed in a different order or in parallel. For example, operations 510, 520, and 530 can be performed in parallel. Similarly, some operations can be omitted in certain scenarios (e.g., a user may choose to view detailed information at 515 but not to execute a test case at 535).

FIG. 6 is a block diagram of an example user interface display window that can display a model of a test system and allow a user to interact with the test system via the model. As shown, the display window 600 includes a test case window 601, test case execution history window 602, a graphical model of a system under test 603, details options 604, and details window 605. Other displays can be used instead of and/or in addition to the one shown in FIG. 6, which is merely provided as an example.

The test case window 601 provides details of the current test case (e.g., including the steps (e.g., as selected by selecting "steps"), filters (e.g., as selected by selecting "filters"), and assertions (e.g., as selected by selecting "assertions") included in the test case), as well as options to see additional details (e.g., by selecting to view base information (by selecting "info") or to select another view (by selecting "views") of the test case information).

Test case execution history window 602 can include information identifying the prior execution of the test case, including properties that resulted from the test case. This information can include information obtained by instrumentation agents and organized by an instrumentation broker. Test case execution history window can also include options to run (by selecting "run") the test case again and/or to modify the settings (by selecting "settings") of the test case.

The graphical model 603 of the system under test can include information identifying each component that participated in the execution of the test case (as identified by the instrumentation modules in the system under test during execution of that test case), as well as some characteristic information, such as response times T1-T3 (which can also be derived from characteristic information generated by the instrumentation modules). In this example, each component is represented as a block and each transaction is represented as a line connecting two blocks.

Details options 604 can include selectable options that allow a user to select a component and/or transaction in graphical model 603 and then see corresponding details. For example, a user can select to see basic information (by selecting "base info") identifying a component or transaction, details about log messages generated by a particular component during execution of the test case (by selecting "log msgs"), details regarding the timing and/or contents of a particular request (by selecting "request"), details regarding the timing and/or contents of a particular response (by selecting "response"), details regarding EJB3s involved in a particular transaction (by selecting "EJB3"), details regarding the SQL statements or queries made by a particular component (by selecting SQLs), a summary (e.g., by selecting "SQL summary") of the SQL activity (e.g., a summary of the number of rows returned in response to an SQL query or the like), the raw XML content included in a particular request or response (by selecting "raw XML"), or the details of a document object model (DOM) tree representing the XML content included in a particular request or response (by selecting "DOM tree"). Details window can display the details selected by user selection of one of details options 604.

Figure 7:
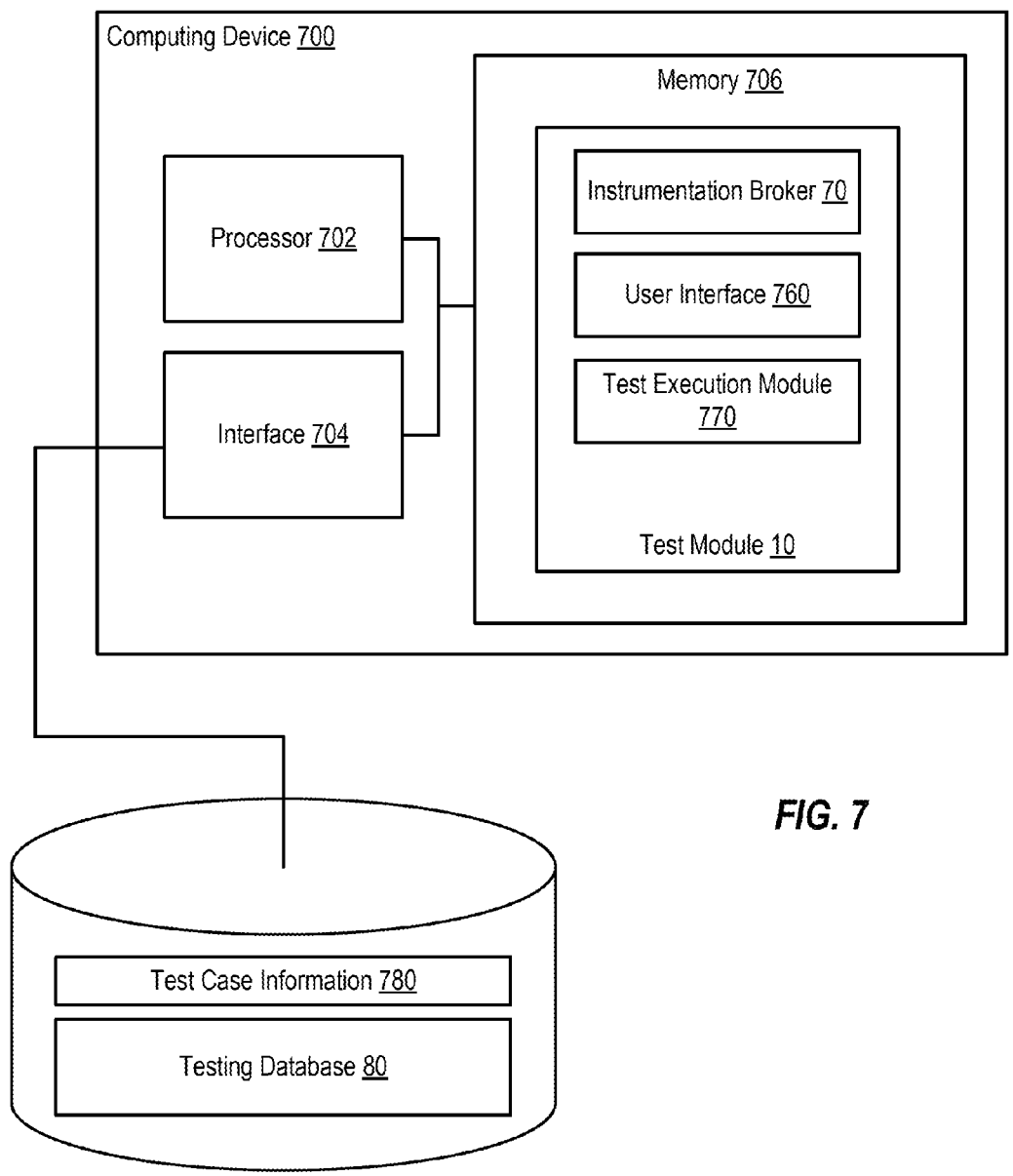
FIG. 7 is a block diagram of a computing device, illustrating how an instrumentation broker and other components of a test module can be implemented in software, according to one embodiment of the present invention.

FIG. 7 is a block diagram of a computing device, illustrating one example of a software implementation of an example instrumentation broker and other components of a testing system. As shown, a computing device 700 can include a processor 702 (e.g., a microprocessor, programmable logic device (PLD), or application specific integrated circuit (ASIC), or multiple such processors), one or more interfaces 704, and memory 706. Instructions executable by processor 702 are stored in memory 706. These instructions are executable to implement test module 10. Computing device 700 can be a personal computer, server, personal digital assistant, cell phone, laptop, workstation, or the like. Memory 706 can each include various types of computer readable storage media, such as RAM (Random Access Memory), ROM (Read Only Memory), Flash memory, MEMS (Micro Electro-Mechanical Systems) memory, and the like. Processor 702, memory 706, and interface(s) 704 are coupled to send and receive data and control signals by a bus or other interconnect.

Interfaces 704 can each include an interface to a storage device on which instructions and/or data (e.g., such as data identifying a test case or a testing database, including characteristic information generated by one or more instrumentation agents and organized by an instrumentation broker) are stored. Interfaces 704 can also each include an interface to a network, such as a local area network (LAN) or wide area network (WAN) such as the Internet, for use in communicating other devices and components. Such an interface can allow test module 10 to send requests to and receive responses from services and other test system components via a network. Similarly, such an interface can allow an instrumentation broker to receive frames generated by instrumentation agents. Interface 704 can also include interfaces to various peripheral Input/Output (I/O) devices, such as a monitor, on which a graphical display (e.g., allowing a user to view a model and control the testing of system under test by interacting with the model) can be displayed.

Test module 10 includes instrumentation broker 70, user interface 760, and test execution module 770. Instrumentation broker 70 is configured to receive frames, which contain characteristic information generated by instrumentation agents, and to organize those frames for storage in testing database 80. Multiple sets of transactions can be maintained in testing database 80. Furthermore, multiple sets of test case results, each including one or more transactions, can be stored in testing database 80.

User interface 760 is configured to access testing database 80 and then use that information to display at least some of the information (e.g., in the form of a graphical model like that described above) to a user, as well as to allow the user to interact with that information in order to modify a test case. If a user selects to modify a test case, user interface 760 can store the results of the modification in test case information 780, which describes one or more test cases. Test Execution Module 770 is configured to execute test cases identified by test case information 780.

Program instructions and data implementing various software components such as test module 10 can be stored on various computer readable storage media such as memory 706. In some embodiments, such program instructions can be stored on a computer readable storage medium such as a CD (Compact Disc), DVD (Digital Versatile Disc), hard disk, optical disk, tape device, floppy disk, and the like. In order to be executed by a processor, the instructions and data are loaded into memory from the other computer readable storage medium. The instructions and/or data can also be transferred to a computing device for storage in memory via a network such as the Internet or upon a carrier medium.

It is noted that the above figures illustrate specific examples. In other embodiments, different components can be used to implement the testing functionality described above. For example, while specific software components have been described as implementing specific functionality, this functionality can be implemented by different components than those depicted herein. For example, the functionality of test module 10 can be subdivided into multiple other test management components or integrated into another component. Furthermore, the specific components depicted in the figures herein can be combined or subdivided into fewer or additional components. Further element and components of the software tools and systems described herein can be implemented within composite, distributed, and cloud architectures and systems.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

The operations described in this specification can be implemented as operations performed by a data processing apparatus on data stored on one or more computer-readable storage devices or received from other sources. The terms "data processing apparatus," "processor," "processing device," and "computing device" can encompass all kinds of apparatus, devices, and machines for processing data, including by way of example a programmable processor, a computer, a system on a chip, or multiple ones, or combinations, of the foregoing. The apparatus can include general or special purpose logic circuitry, e.g., a central processing unit (CPU), a blade, an application specific integrated circuit (ASIC), or a field-programmable gate array (FPGA), among other suitable options. While some processors and computing devices have been described and/or illustrated as a single processor, multiple processors may be used according to the particular needs of the associated server. References to a single processor are meant to include multiple processors where applicable. Generally, the processor executes instructions and manipulates data to perform certain operations. An apparatus can also include, in addition to hardware, code that creates an execution environment for the computer program in question, e.g., code that constitutes processor firmware, a protocol stack, a database management system, an operating system, a crossplatform runtime environment, a virtual machine, or a combination of one or more of them. The apparatus and execution environment can realize various different computing model infrastructures, such as web services, distributed computing and grid computing infrastructures.

A computer program (also known as a program, software, software application, script, module, (software) tools, (software) engines, or code) can be written in any form of programming language, including compiled or interpreted languages, declarative or procedural languages, and it can be deployed in any form, including as a standalone program or as a module, component, subroutine, object, or other unit suitable for use in a computing environment. For instance, a computer program may include computer-readable instructions, firmware, wired or programmed hardware, or any combination thereof on a tangible medium operable when executed to perform at least the processes and operations described herein. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Programs can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate. In certain cases, programs and software systems may be implemented as a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, applications may represent web-based applications accessed and executed via a network (e.g., through the Internet). Further, one or more processes associated with a particular hosted application or service may be stored, referenced, or executed remotely. For example, a portion of a particular hosted application or service may be a web service associated with the application that is remotely called, while another portion of the hosted application may be an interface object or agent bundled for processing at a remote client. Moreover, any or all of the hosted applications and software service may be a child or sub-module of another software module or enterprise application (not illustrated) without departing from the scope of this disclosure. Still further, portions of a hosted application can be executed by a user working directly at a server hosting the application, as well as remotely at a client.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), tablet computer, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device, including remote devices, that are used by the user.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include any internal or external network, networks, sub-network, or combination thereof operable to facilitate communications between various computing components in a system. A network may communicate, for example, Internet Protocol (IP) packets, Frame Relay frames, Asynchronous Transfer Mode (ATM) cells, voice, video, data, and other suitable information between network addresses. The network may also include one or more local area networks (LANs), radio access networks (RANs), metropolitan area networks (MANs), wide area networks (WANs), all or a portion of the Internet, peer-to-peer networks (e.g., ad hoc peer-to-peer networks), and/or any other communication system or systems at one or more locations.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
   identifying, using at least one processing device, a first frame from a first agent describing characteristics of a particular portion of a transaction detected by the first agent during monitoring of a first software component;
   identifying, using at least one processing device, a second frame from a second agent describing characteristics of the particular portion detected by the second agent during monitoring of a second software component, wherein the transaction includes a plurality of portions comprising the particular portion and each portion comprises a respective request and a respective response;
   identifying, using at least one processing device, a third frame from the first agent describing characteristics of another portion of the transaction, wherein the other portion involves a communication between the first software component and a third software component;
   generating, using at least one processing device, a synthetic frame corresponding to an unknown portion of the other transaction, wherein the unknown portion corresponds to characteristics at the third software component;
   determining, using at least one processing device, that both the first and second frames correspond to the particular portion of the transaction involving the first and second software components based on each of the first and second frames describing corresponding characteristics of the particular portion; and
   generating, using at least one processing device, a model of the transaction based at least in part on the first frame, the second frame, the third frame, and the synthetic frame, wherein the model includes a representation of a flow of the transaction describing an ordering of the portions of the transaction, the representation including a representation of the involvement of the first and second software components within the particular portion of the transaction, and the involvement of the first and third software components with the other portion of the transaction, and the ordering is determined based at least in part on a particular characteristic in at least one of the first and second frames.

2. The method of claim 1, wherein the first and second frames identify characteristics including timing information of the particular transaction.

3. The method of claim 2, wherein the first frame includes first timing information identifying timing of the involvement of the first software component in the particular portion of the transaction and the second frame includes second timing information identifying timing of the involvement of the second software component in the particular portion of the transaction.

4. The method of claim 2, wherein determining that the first and second frames each identify characteristics of the particular portion of the transaction includes identifying a correlation between timing information included in the first frame and timing information included in the second frame.

5. The method of claim 4, wherein the first and second frames identify characteristics including amounts of data involved in the particular portion of the transaction, and determining that the first and second frames each identify characteristics of the particular portion of the transaction includes identifying a correlation between an amount of data identified in the first frame and an amount of data identified in the second frame.

6. The method of claim 2, wherein the model includes a representation of timing of the particular portion of the transaction.

7. The method of claim 6, wherein generating the model includes determining that involvement of the first software component precedes, in time, involvement of the second software component within the particular portion of the transaction.

8. The method of claim 1, wherein
   the third software component does not have an active, corresponding agent.

9. The method of claim 8, further comprising determining an ordering of the respective involvement of the first and third software components within the second portion of the transaction based at least in part on the third frame.

10. The method of claim 8, further comprising determining an ordering of the second portion of the transaction relative to the particular portion of the transaction based at least in part on the first, second, and third frames.

11. The method of claim 1, wherein the model includes representations of at least one other transaction in the plurality of transactions in addition to the particular portion of the transaction based on a plurality of frames, including the first and second frames and at least one other frame.

12. The method of claim 11, further comprising sorting the plurality of frames into respective transaction portions in the plurality of transaction portions.

13. The method of claim 11, wherein generating the model includes determining ordering of the plurality of transaction portions.

14. The method of claim 1, wherein the first and second frames are collected, using the first and second agents respectively, during execution of a test of a software system including the first and second software components.

15. The method of claim 1, wherein the first and second frames identify characteristics including amounts of data involved in the particular portion of a transaction, and determining that the first and second frames each identify characteristics of the particular portion of a transaction includes identifying a correlation between an amount of data identified in the first frame and an amount of data identified in the frame.

16. The method of claim 1, wherein the first and second software components are sub-components of a common software component and generating the model includes generating a representation of the common software component based at least in part on the first and second frames.

17. The method of claim 1, wherein the model is a graphical model graphically representing each of the first and second software components and involvement of the first and second software components within the particular portion of a transaction.

18. The method of claim 17, wherein the model graphically represents the plurality of transaction portions involving at least the first and second software components.

19. An article comprising non-transitory, machine-readable media storing instructions operable to cause at least one processor to perform operations comprising:
identifying a first frame from a first agent describing characteristics of the particular portion of a transaction detected by the first agent during monitoring of a first software component;
identifying a second frame from a second agent describing characteristics of the particular portion detected by the second agent during monitoring of a second software component, wherein the transaction includes a plurality of portions comprising the particular portion and each portion comprises a respective request and a respective response;
identifying a third frame from the first agent describing characteristics of another portion of the transaction, wherein the other portion involves a communication between the first software component and a third software component;
generating a synthetic frame corresponding to an unknown portion of the other transaction, wherein the unknown portion corresponds to characteristics at the third software component;
determining that both the first and second frames correspond to the particular portion of the transaction involving the first and second software components based on each of the first and second frames describing corresponding characteristics of the particular; and
generating a model of the transaction based at least in part on the first frame, the second frame, the third frame, and the synthetic frame, wherein the model includes a representation of a flow of the transaction describing an ordering of the portions of the transaction, the representation including a representation of the involvement of the first and second software components within the particular portion of the transaction, and the involvement of the first and third software components with the other portion of the transaction, and the ordering is determined based at least in part on a particular characteristic in at least one of the first and second frames.

20. A system comprising: a memory element storing data; a processor operable to execute instructions associated with the stored data; an instrumentation broker configured to:
identify a first frame from a first agent describing characteristics of a particular portion of a transaction detected by the first agent during monitoring of a first software component;
identify a second frame from a second agent describing characteristics of the particular portion detected by the second agent during monitoring of a second software component, wherein the transaction includes a plurality of portions comprising the particular portion and each portion comprises a respective request and a respective response;
identify a third frame from the first agent describing characteristics of another portion of the transaction, wherein the other portion involves a communication between the first software component and a third software component;
generate a synthetic frame corresponding to an unknown portion of the other transaction, wherein the unknown portion corresponds to characteristics at the third software component;
determine that both the first and second frame correspond to the particular portion of the transaction involving the first and second software components based on each of the first and second frames describing corresponding characteristics of the particular portion; and
a model generator configured to generate a model of the transaction based at least in part on the first frame, the second frame, the third frame, and the synthetic frame, wherein the model includes a representation of a flow of the transaction describing an ordering of the portions of the transaction, the representation including a representation of the involvement of the first and second software components within the particular portion of the transaction, and the involvement of the first and third software components with the other portion of the transaction, and the ordering is determined based at least in part on a particular characteristic in at least one of the first and second frames.

21. The system of claim 20, further comprising a plurality of agents each monitoring a respective software component in a software system, the plurality of agents including the first and second agents, each agent in the plurality of agents configured to:
monitor a respective software component included in the software system;
capture frames identifying characteristics of involvement of the respective software component within portions of the transaction corresponding to the respective frames; and
sending captured frames to the instrumentation broker.

22. The system of claim 21, wherein one or more agents in the plurality of agents are configured to automatically disable upon detecting a period wherein the software component monitored by the agent is not involved in a particular test.

23. An apparatus comprising:
means for identifying a first frame from a first agent describing characteristics of a particular portion of a transaction detected by the first agent during monitoring of a first software component;
means for identifying a second frame from a second agent describing characteristics of the particular portion detected by the second agent during monitoring of a second software component, wherein the transaction includes a plurality of portions comprising the particular portion and each portion comprises a respective request and a respective response;

means for identifying a third frame from the first agent describing characteristics of another portion of the transaction, wherein the other portion involves a communication between the first software component and the third software component;

means for generating a synthetic frame corresponding to an unknown portion of the other transaction, wherein the unknown portion corresponds to characteristics at the third software component;

means for determining that both the first and second frames correspond to the particular portion of the transaction involving the first and second software components based on each of the first and second frames describing corresponding characteristics of the particular portion, wherein the transaction includes a plurality of portions and each portion comprises a respective request and a respective response; and means for generating a model of the particular transaction based at least in part on the first frame, the second frame, the third frame, and the synthetic frame, wherein the model includes a representation of a flow of the transaction describing an ordering of the portions of the transaction, the representation including a representation of the involvement of the first and second software components within the particular portion of the transaction, and the involvement of the first and third software component with the other portion of the transaction, and the ordering is determined based at least in part on a particular characteristic in at least one of the first and second frames.

* * * * *